(12) United States Patent
Arasaratnam (10) Patent No.: US 8,615,789 B2
(45) Date of Patent: Dec. 24, 2013

(54) TRUST ASSERTION USING HIERARCHICAL WEIGHTS

(75) Inventor: Omkharan Arasaratnam, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/782,860

(22) Filed: May 19, 2010

(65) Prior Publication Data

US 2011/0055897 A1    Mar. 3, 2011

(51) Int. Cl.
*H04L 29/00*    (2006.01)
(52) U.S. Cl.
USPC .................................. 726/3; 713/168; 709/22
(58) Field of Classification Search
USPC ............................................. 726/3; 713/168
See application file for complete search history.

(56) References Cited

U.S. PATENT DOCUMENTS

| | | | |
|---|---|---|---|
| 6,178,505 B1 | 1/2001 | Schneider et al. | |
| 7,092,943 B2 * | 8/2006 | Roese et al. | 1/1 |
| 7,856,658 B2 * | 12/2010 | James | 726/6 |
| 2008/0275719 A1 * | 11/2008 | Davis et al. | 705/1 |

* cited by examiner

*Primary Examiner* — Jeffrey Pwu
*Assistant Examiner* — Helai Salehi
(74) *Attorney, Agent, or Firm* — Andrea Bauer; Hoffman Warnick LLC (57) ABSTRACT

An illustrative embodiment provides a computer-implemented method for access control by trust assertion using hierarchical weights. The computer-implemented method comprises obtaining an access request for an asset, identifying a trust value associated with a set of paths associated with the access request to form an identified trust value. The identified trust value is compared with a required trust value and a determination as to whether the identified trust value is greater than or equal to the required trust value is made. Responsive to a determination that the identified trust value is greater than or equal to the required trust value, access to the asset is permitted.

19 Claims, 7 Drawing Sheets

| Node | Trust value |
|------|-------------|
| A | 1 |
| B | 1 |
| C | 1 |
| D | 1 |
| E | -1      406 |
| F | 1 |

Node trust table 400

FIG. 5

| Asset Sensitivity | Required Trust Value |
|---|---|
| PII | ≥ 1    506 |
| High | ≥ 0.5 |
| Medium | ≥ 0.25 |
| Low | ≥ 0.125 |
| Public | ≥ 0.0625    508 |

Sensitivity table 500

TRUST ASSERTION USING HIERARCHICAL WEIGHTS

BACKGROUND

1. Technical Field

This disclosure relates generally to access control of assets in a data processing system and more specifically to access control by trust assertion using hierarchical weights.

2. Related Art

As dynamic partnerships become more prevalent, within and among data processing systems, a method for accurately determining trust for unknown partners becomes a requirement. Modern technologies such as Services Oriented Architecture implementations have become pervasive enabling unknown partners to use services provided for sharing. Typically there is no secure method of determining the trust or worthiness of a potential services supplicant who does not have a close relationship with the service provider. A close relationship is typically defined as one in which a trust distance of one is maintained. The trust distance in this case refers to the distance between the two parties.

The close proximity then leads to one of two scenarios. In first example, an unknown supplicant is only granted access to a very restricted set of services. In a second example, an unknown supplicant is granted access to a wider set of services that may be inappropriate. Each example leads to an undesirable balance between security and capability. In the first example the supplicant may be unnecessarily restricted from access to needed information as a cautious response to the situation. In the second example the reverse happens in granting access to too much information because accurate trust information is not available.

Typically trust can only be accurately granted to supplicants with one degree of trust separation, a trust distance of one. When the separation between the requester of access to an asset and the approver of the request or asset owner become more than one degree, typical systems do not respond well. Distributed systems typically maintain central control over asset access, with requesters being registered directly with the central control mechanism.

SUMMARY

According to an embodiment, a computer-implemented method for access control by trust assertion using hierarchical weights is presented. The computer-implemented method comprises obtaining an access request for an asset, and identifying a trust value associated with a set of paths associated with the access request to form an identified trust value. The identified trust value is compared with a required trust value and a determination as to whether the identified trust value is greater than or equal to the required trust value is made. Responsive to a determination that the identified trust value is greater than or equal to the required trust value, access to the asset is permitted.

According to another embodiment, there is provided a computer program product, stored on a computer readable storage medium, for access control by trust assertion using hierarchical weights. The computer program product comprises computer executable program code for: obtaining an access request for an asset; identifying a trust value associated with a set of paths associated with the access request to form an identified trust value; comparing the identified trust value with a required trust value; determining whether the identified trust value is greater than or equal to the required trust value; and responsive to a determination that the identified trust value is greater than or equal to the required trust value, for permitting access to the asset.

According to another embodiment, an apparatus for access control by trust assertion using hierarchical weights is disclosed. The apparatus comprises: at least one computing device configured to perform a method including: obtaining an access request for an asset; identifying a trust value associated with a set of paths associated with the access request to form an identified trust value; comparing the identified trust value with a required trust value; determining whether the identified trust value is greater than or equal to the required trust value; and responsive to a determination that the identified trust value is greater than or equal to the required trust value, for permitting access to the asset

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied (e.g., stored) in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
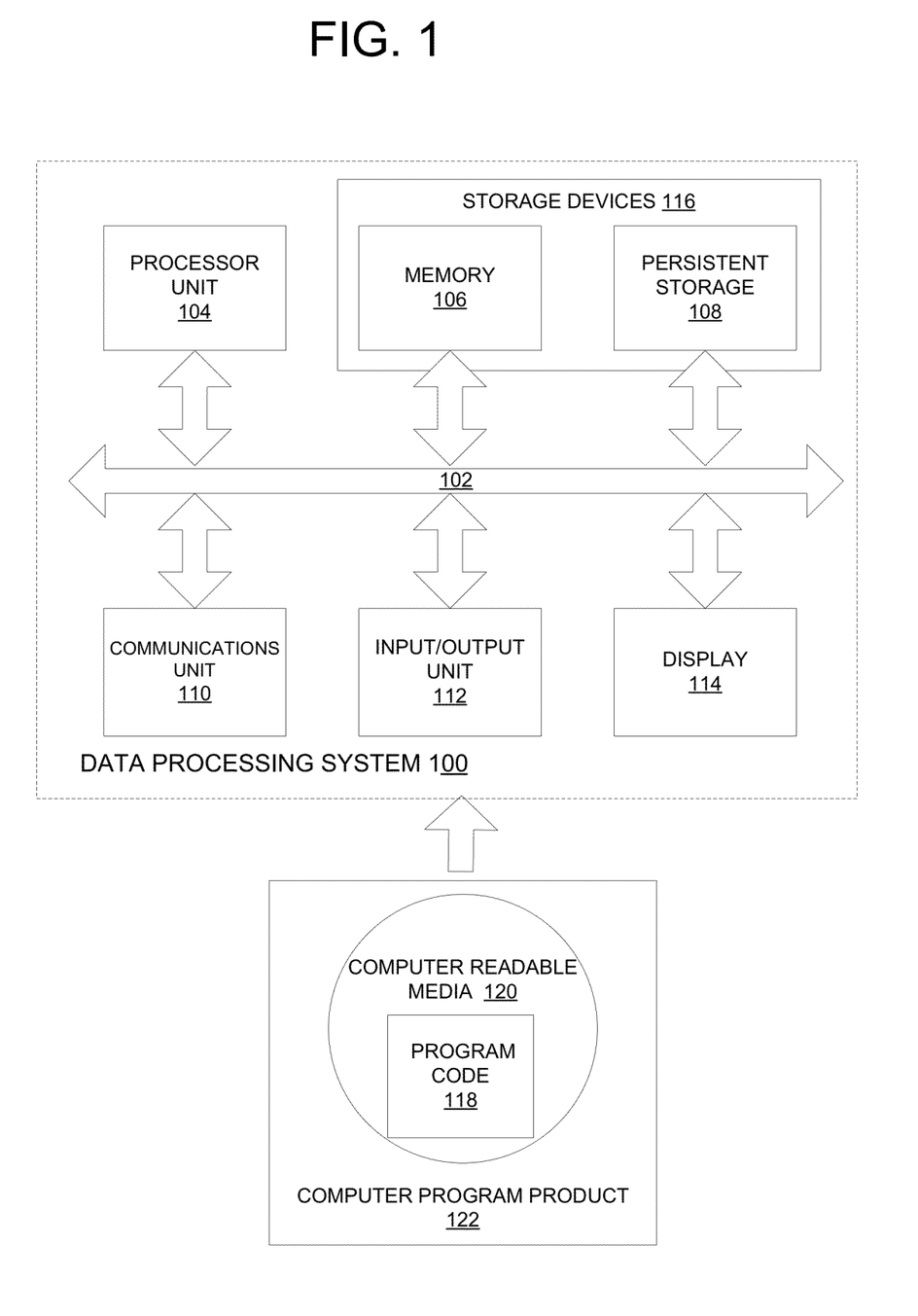
FIG. 1 is a block diagram of an exemplary data processing system operable for various embodiments of the disclosure.

Turning now to FIG. 1, a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied (e.g., stored) on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented method for access control by trust assertion using hierarchical weights is presented. Using data processing system 100 of FIG. 1 as an example, an illustrative embodiment provides the computer-implemented method stored in memory 106, executed by processor unit 104, comprising obtaining an access request for an asset that may be stored in persistent storage 108 or in storage devices 116, through communications unit 110, input/output unit 112, identifying a trust value associated with a set of paths associated with the access request to form an identified trust value. The identified trust value is compared with a required trust value and a determination as to whether the identified trust value is greater than or equal to the required trust value is made. Responsive to a determination that the identified trust value is greater than or equal to the required trust value, access to the asset is permitted.

In an alternative embodiment, program code 118 containing the computer-implemented method may be stored within computer readable media 120 as computer program product 122. In another illustrative embodiment, the process for access control by trust assertion using hierarchical weights, may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
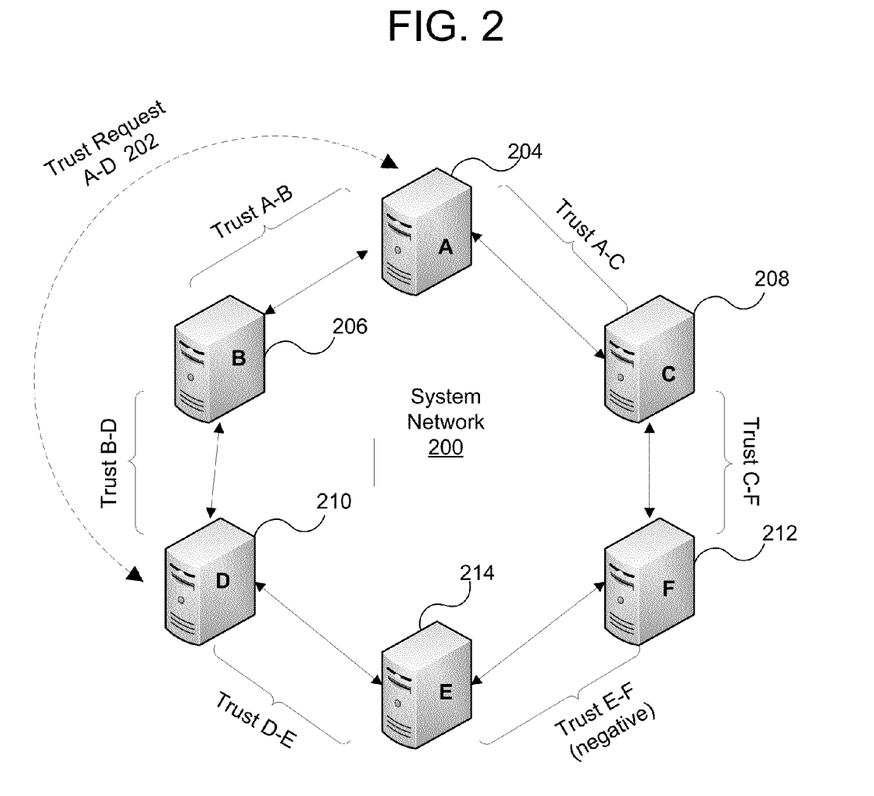
FIG. 2 is a block diagram of a system network, in accordance with various embodiments of the disclosure.

With reference to FIG. 2, a block diagram of a system network 200, in accordance with various embodiments of the disclosure, is presented. System network 200 represents a set of systems representing data processing systems previously described as data processing system 100 of FIG. 1. Each system "A" through "F" is a node within system network 200 and may be referred to, for example, as node A or system 204 interchangeably. In the example, system 204 is connected to system 206 and system 208. System 206 is connected to system 210 that is also connected to system 214. System 214 is connected to system 212, which is connected to system 208.

In this example the systems are connected to form a ring as depicted, with each system connected to two adjacent systems because each system does not have knowledge of each other system in system network 200. Other connection arrangements may be made to form other connecting configurations, such as a star or web of interconnected nodes that may require systems to have more of less knowledge of other systems in the network. Each pair of connected systems forms a pair of connected nodes. Each pair of nodes has an associated trust relationship depicted in FIG. 2 as trust node-node. For example the trust relationship between system 204 and system 206 is shown as "Trust A-B." Other node pairs are referenced in a similar manner.

In the example of system network 200, a node represents a provider of a service. System network 200 is then a collection of nodes. A truster is a system, such as system 210, from which supplicants request services. A trusted node represents a known node that has previously requested services, successfully, from the truster. An un-trusted node is then an unknown node that has not previously requested services from the truster or unsuccessfully requested services. A trust relationship is a one-to-one evaluation between a truster and a trusted node. A trust distance is a distance between one node and another node, or node pairs, in trust relationships. Trust assertion is a maximum value of trust that can be asserted by a trusted node of an unknown node. The trust assertion is calculated using a trust distance of a trusted node between the un-trusted node and the truster. Trust is then a calculated summary of all the trust assertions of the nodes within the system along paths for a particular node.

Although the example of system network 200 presents a collection of nodes or systems as separate physical units, the collection may also be implemented as logically separate node or systems within a physical system. For example a collection of systems or nodes may be implemented as a set of logically partitioned systems implemented within a single physical data processing system. The example also illustrates that a system or node may be represented in hardware, software or a combination of hardware and software. In the example provided, access control is therefore exhibited between physical nodes or systems as well as software capable of representing the physical systems or nodes and a combination of hardware and software. Implementations may be therefore comprised of real or virtual systems or nodes without loss of capability.

Examples provided in the following illustrative embodiments make reference to controlling access to assets, wherein assets may be selected from a set of assets that encompass physical resources or logical resources or a combination of physical and logical resources, wherein the resources further include services. Services may comprise functions or collections of functions in the form of applications or components of applications that may be further combined to form services. Services may also be distributed within a network such as system network 200 and located as needed through a directory service.

When a user on system 210 needs access to an asset on system 204, a trust request A-D 202 is issued. Trust request A-D 202 uses the path between the end nodes of system 204 and system 210. In the example, when system 204 does not know system 210, system 204 relies on trust information from system 206. The amount of trust between systems and along a path between systems can be calculated. Comparing the trust value for the nodes with a threshold value for the asset determines when access to an asset is permitted.

Figure 3:
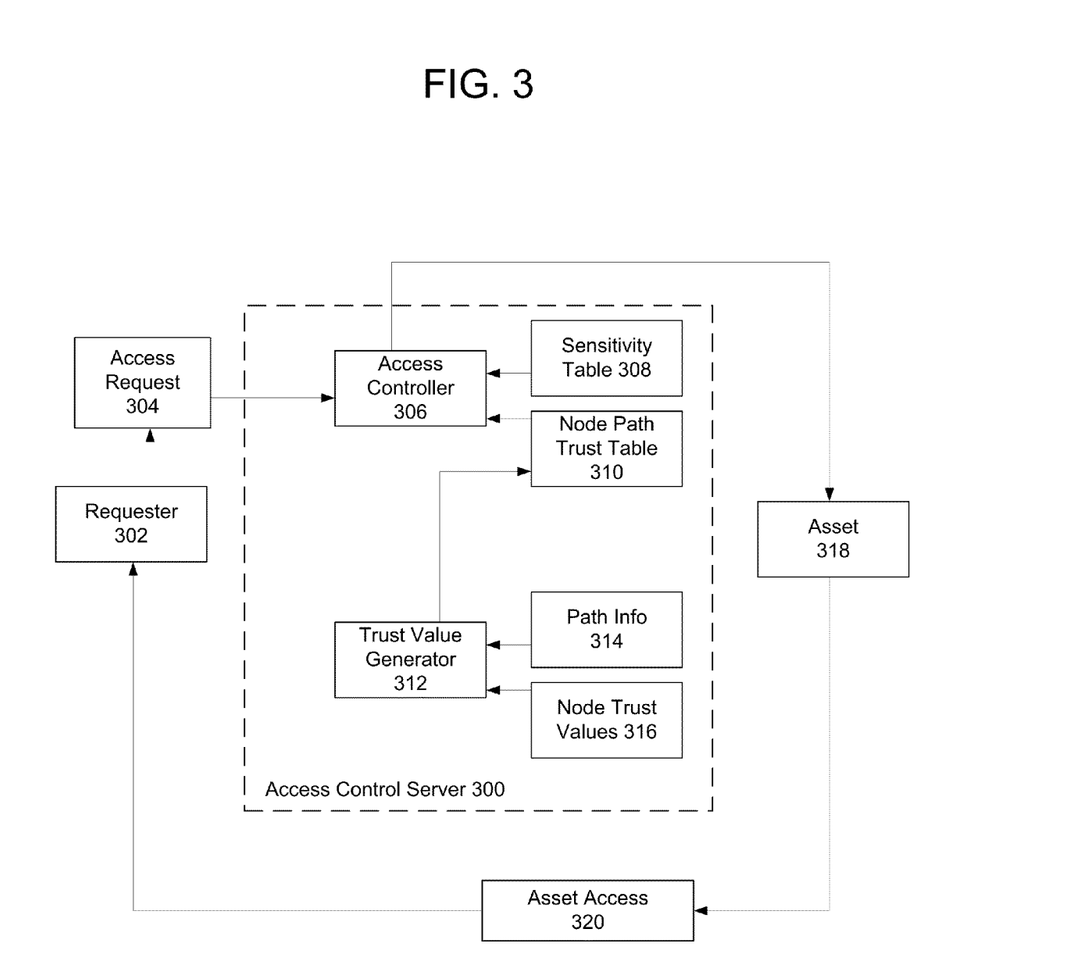
FIG. 3 is a block diagram of an access control server in the system network of FIG. 2 in accordance with an embodiment of the disclosure.

With reference to FIG. 3, a block diagram of an access control server in the system network of FIG. 2 in accordance with one embodiment of the disclosure is presented. Access control server 300 is an example of an access control mechanism used with the configuration depicted in system network 200 of FIG. 2. Requester 302, such as system 210 of FIG. 2, sends access request 304 for asset 318. Access control server 300 may receive the request directly or indirectly depending upon an implementation of the server. When access request 304 is approved, asset access 320 is returned to requester 302 by access controller 306 of access control server 300. Access control server 300 may be implemented in hardware, software or a combination of hardware and software.

Access control server 300 invokes access controller 306 to determine whether request 304 is permitted. In determining whether to permit the requested access, access controller 306 uses information from sensitivity table 308 and node path trust table 310. Although described as tables, sensitivity table 308 and node path trust table 310 may be implemented using other data structures including arrays, lists, vectors and other well known look-up mechanisms.

Sensitivity table 308 provides a threshold value for an asset that can be compared to a trust value of a requesting system. Node path trust table 310 provides a trust value for a requesting node that may be an unknown node at the end of the path to the truster. Node path table 310 contains values representing a trust relationship evaluation between a truster and trusted nodes along a specified node path, such as between system 204 and system 206 and system 206 and system 210. The trust assertion is calculated for the path using a trust distance of a trusted node between the un-trusted node and the truster. Trust is then a calculated summary of all the trust assertions of the nodes of system 204, system 206 and system 210 as one path. In a similar trust assertions are calculated along an additional path of system 204, system 208, system 212, system 214 and system 210 of FIG. 2.

The sensitivity and business importance of the service or asset to be accessed is also taken into account using sensitivity table 308. Therefore, categorized services that produce information assets with less sensitivity and/or business importance can be accessed with a corresponding lower "trust score" than services that produce more sensitive/important information assets. Sensitivity table 308 is an example of a data structure containing categorized data regarding access levels for associated assets.

Entries in node path trust table 310 are created using trust value generator 312. Trust value generator 312 calculates trust values using information from path info 314 and node trust values 316. Path info 314 contains information for a series of systems within a requested path as determined by related nodes for an access request. For example, path information is obtained for access request 304 in which systems 204, 206 and 210 of FIG. 2 define the nodes of a path from system 210 to system 204. Path information specifying which systems are used may be derived from sources such as a directory server indicating the various systems between end points associated with an access request. The end points are the truster and the requester system, such as system 204 and 210 respectively. The requester system may be known or unknown.

Node trust values 316 may be provided as a table of values representing the trust assertion associated with each node of a system or system network 200 of FIG. 2. A node trust value assigned to a particular system may be manually assigned and saved in a data structure such as node trust values 316 or the node trust value may be calculated at run-time. Node trust values typically range between +1 and −1, but other values may be used. A value of +1 is the maximum trust assertion for a node or system and −1 is the least trust assertion in these examples. Further, a default trust assertion may be assigned to a system or node. For example, all trusted systems may be assigned a trust value of "1" while all un-trusted systems are assigned a default trust assertion of "−1."

In the example of FIG. 2 and FIG. 3, asset control server 300 uses a requesting supplicant's trust relationships with other supplicants in a process of validating the requester's or unknown supplicant's, trustworthiness. The amount of trust asserted to an unknown system or node is inversely proportional to the trust distance of the trust assertion between the truster and the un-trusted node. The ratio is contrary to other validation systems that only allow one level of separation between the truster and the un-trusted node. Access control server 300 also allows other nodes within the system, with varying degrees of trust distance with the un-trusted node, to assert trust. The process of access control server 300 handles the appropriate weighting of trust value based on the trust distance.

Therefore, unknown supplicants can be permitted to access more sensitive information based on how trustworthy their trusted peers judge them. A trust network may be defined to a much deeper level based on a distance between a truster and un-trusted node. The weighting process of access control server 300 may also help to avoid "skewing" or "poisoning" of trust data by nefarious parties with close relationships to the truster.

Figure 4:
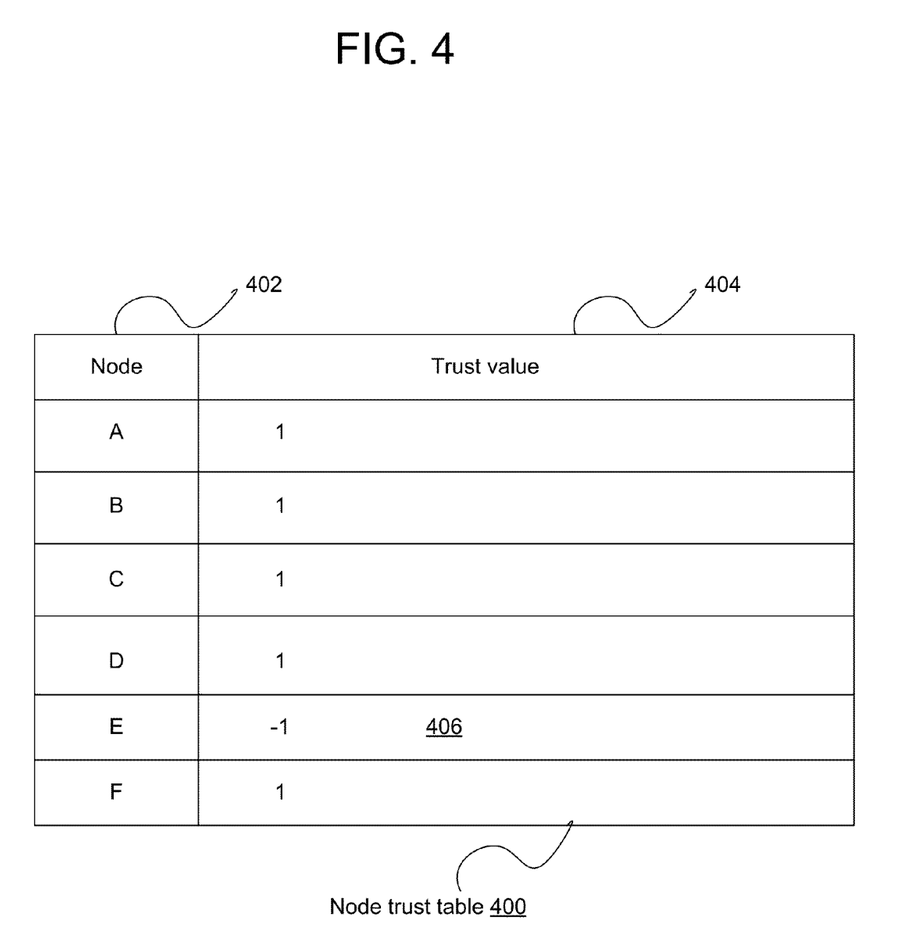
FIGS. 4 is a block diagram of a set of node trust values used by the access control server of FIG. 3 in accordance with an embodiment of the disclosure.

With reference to FIGS. 4, a block diagram of a set of node trust values used by the access control server of FIG. 3 in accordance with an embodiment of the disclosure is presented. Node trust table 400 is an example of a data structure containing node trust values 316 of FIG. 3. In the example, node trust table 400 contains node 402 and trust value 404 columns. The node 402 column contains an entry for each node for which a value is assigned. Using the example of system network 200 of FIG. 2, nodes A-F are listed in rows of node trust table 400.

For each node listed in the table a corresponding entry of a trust value is placed in the trust value 406 column. The example of node trust table 400 depicts a value of "1" for each row of the trust value 404 column, except for row 406. Row 406 contains a value of "−1" denoting the trust assertion for system 214, node E, is negative. A negative trust assertion indicates distrust.

Figure 5:
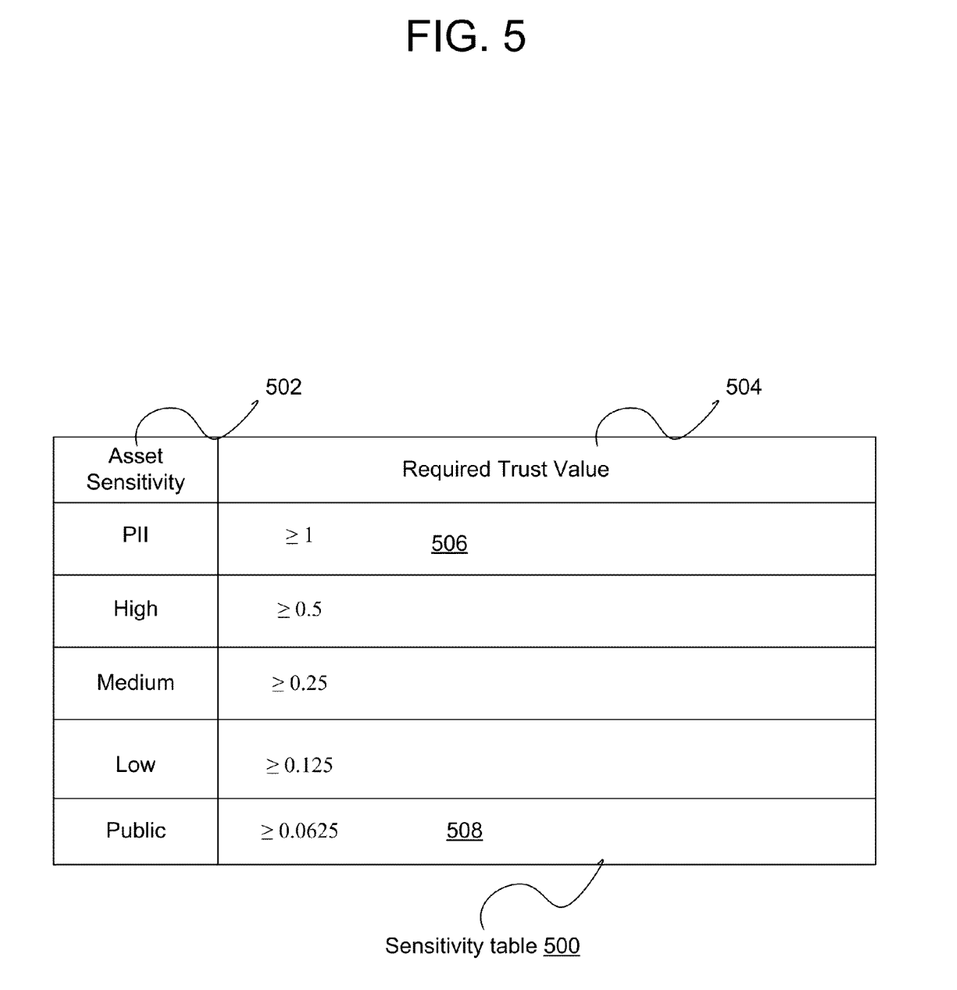
FIG. 5 is a block diagram of a set of sensitivity values used by the access control server of FIG. 3 in accordance with an embodiment of the disclosure.

With reference to FIG. 5, a block diagram of a set of values used by the access control server of FIG. 4 in accordance with an embodiment of the disclosure is presented. Sensitivity table 500 is an example of a data structure, as in sensitivity table 308 of FIG. 3, containing sensitivity values associated with assets. Sensitivity table 500, while depicted in tabular for is not limited to the implementation of the example and may take other forms including a relational database table, a list, array or vector.

Sensitivity table 500 contains information defining the sensitive nature associated with an asset. In the example, sensitivity table 500 contains rows and columns wherein columns containing asset sensitivity 502 and required trust value 504 are depicted. Asset sensitivity 502 defines a number of categories to which an asset may be assigned. Sensitivity associated with an asset increases from a low level of "public" upward to a category of "PII." The labels may be specific to an installation or set of resources and are not limited by the example shown.

Required trust value 504 defines the accepted threshold value for access to the asset having the corresponding category listed in the table. For example, row 506 indicates a value of "≥1" is required to obtain access to an asset sensitivity category of "PII." In another example, row 508 indicates a value of "≥0.0625" is required to obtain access to an asset associated with a sensitivity category of "Public."

A comparison between a request for access containing a trust value and an asset sensitivity value may then be performed to determine whether to permit access. The comparison may be direct using a threshold value or indirect by reference to the category. In either case the request for access comprising a trust value of a trust assertion must meet the criteria expressed by the sensitivity value associated with the requested asset.

Figure 6:
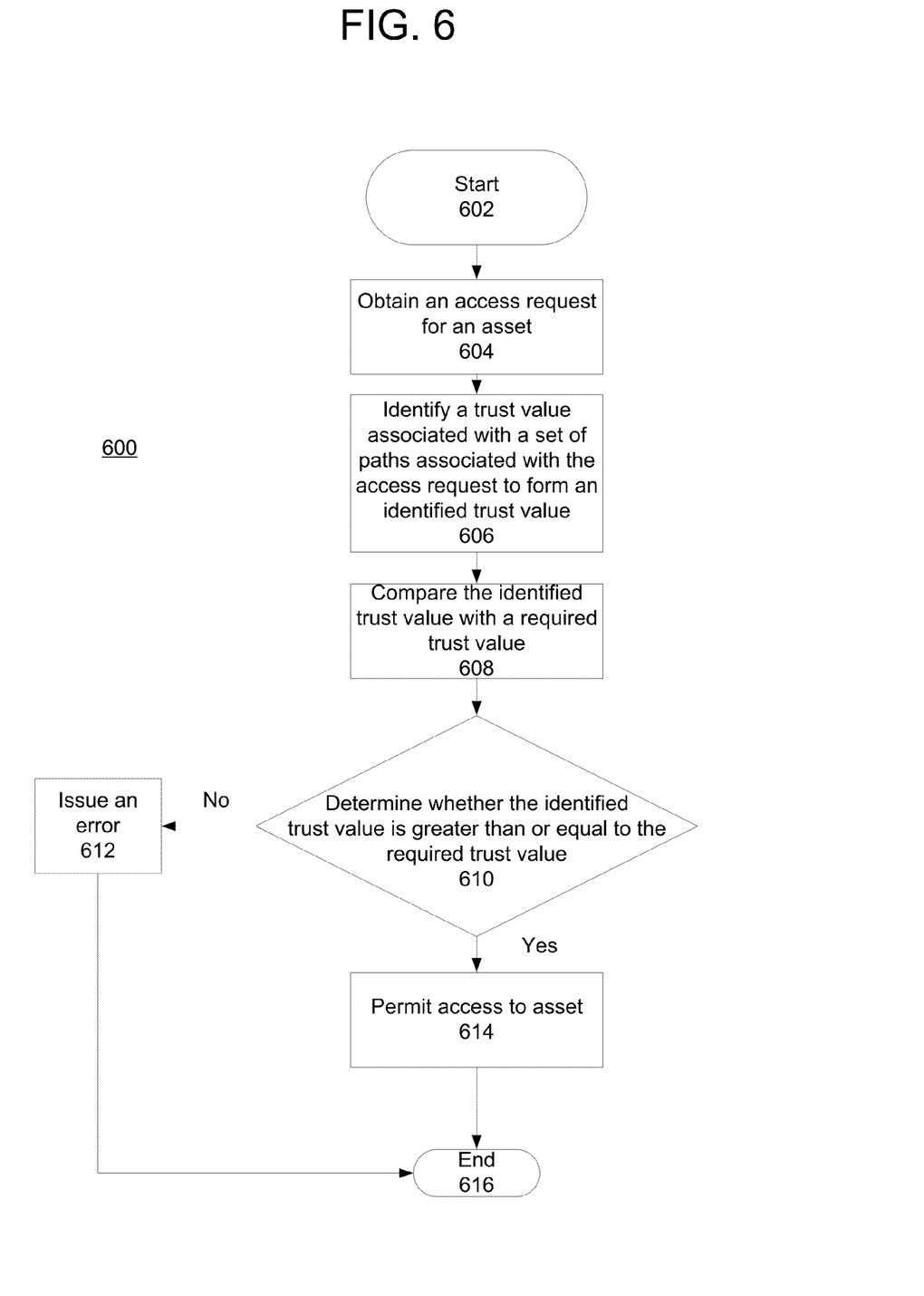
FIG. 6 is a flowchart of a process of the access control server of FIG. 3 in accordance with an embodiment of the disclosure.

With reference to FIG. 6, a flowchart of a process of the access control server of FIG. 3 in accordance with an embodiment of the disclosure is presented. Process 600 is an example of a process using access control server 300 of FIG. 3.

Process 600 starts (602) and obtains an access request for an asset (604). Obtaining the access request may be performed by methods including polling by a server, directed receipt in which a requester makes a request specific to the access control server, and indirectly where an asset manager routes a request for access to an access control server.

Identification of a trust value associated with a set of paths associated with the access request is performed to form an identified trust value (606). The identified trust value may be associated with a single system, or multiple systems, as in a path defined between two end points. The end points represent the request system and the truster system that has the asset requested. The request system may or may not be trusted.

A comparison of the identified trust value to a required trust value is performed (608). A comparison is made between the identified trust value associated with the request and a threshold value, the required trust value, associated with the requested asset. In the examples, the required trust value is obtained from sensitivity table 308 of access control server 300 of FIG. 3. Using the comparison, a determination of whether the identified trust value is greater than or equal to the required trust value is performed (610). A determination is made as to whether access is permitted. When the identified trust value is greater than or equal to the required trust value a "yes" is obtained in 610. When the identified trust value is not greater than or equal to the required trust value a "no" is obtained in 610.

When a "no" is obtained in 610, an error results (612) and process 600 terminates thereafter (616). When a "yes" is obtained in step 610, access to the asset is permitted (614) with process 600 terminating thereafter (step 616).

Figure 7:
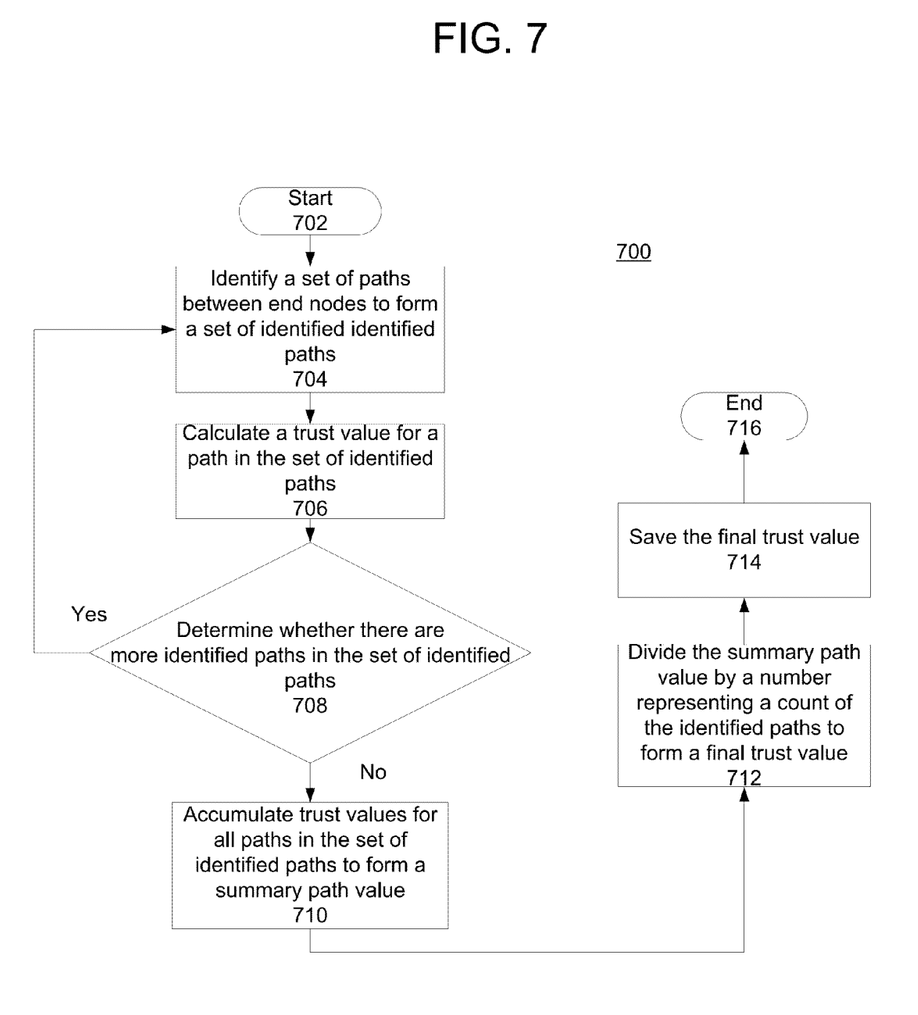
FIG. 7 is a flowchart of a trust value calculation process within the process of FIG. 6 in accordance with an embodiment of the disclosure.

With reference to FIG. 7, a flowchart of a trust value calculation process within the process of FIG. 6 in accordance with an embodiment of the disclosure is presented. Process 700 is an example of a calculation process used with access control server 300 of FIG. 3.

Process 700 starts (702) and identifies a set of paths between end nodes to form a set of identified paths (704). The end nodes are the node or system from which the request is received and the node or system that has the requested asset. The path comprises intermediate nodes between the two end nodes. In the example containing two nodes, one system is a requester and the other is a truster. The requester may or may not be a known node. There may be a set of identified paths between the two end nodes or systems. The set of identified paths comprises one or more identified paths.

A trust value for an identified path in the set of identified paths is calculated (706). A calculation is performed using trust assertions for each node along the path between the specific end nodes. Having calculated a trust value for a path in the set of identified paths, a determination as to whether there are more identified paths in the set of identified paths is performed (708). When there are more identified paths in the set of identified paths, a "yes" is obtained in 708. When there are no more paths in the set of identified paths, a "no" is obtained in 708.

When a "yes" is obtained in 708, process 700 loops back to 704. When a "no" is obtained in 708, process 700 accumulates trust values for all paths in the set of identified paths to form an intermediate trust value (710).

A final trust value is determined by dividing the intermediate trust value by a number representing a count of the identified paths (712). The final trust value is saved (714) wherein process 700 terminates thereafter (716).

For example, using process 700 with reference to the systems of system network 200 of FIG. 2, system 210 of node D is requesting trusted access to system 204 of node A. System 204 has no pre-existing trust relationship with system 210, therefore node D is not trusted. System 204, of node A trusts system 206 of node B that has a trust relationship with system 210 of node D. A path is thus formed from system 210 through system 206 to system 204.

System 204 of node A also has a trust relationship with anther system, system 208 of node C. System 206 of node C further has a trust relationship with system 212 of node F. System 212 of node F however has a negative trust relationship (system 212 does not trust) with system 214 of node E. A second path between system 210 and system 204 is thus identified. A trust value for the combination of identified paths is then calculated.

According to the trust path identified through system 206 of node B:

$$Trust(D\text{->}A)_B = Trust(D\text{->}B)_A + Trust(B\text{->}A)_A(\tfrac{1}{2}) = (1+1)(\tfrac{1}{2})$$

$$Trust(D\text{->}A)_B = 1$$

According to the trust path through system 208 of node C:

$$Trust(D\text{->}A)_c = Trust(D\text{->}E)_c + Trust(E\text{->}F)_c + Trust(F\text{->}C)_c + Trust(C\text{->}A)_c(\tfrac{1}{4})$$

$$Trust(D\text{->}A)_c = (1 + -1 + 1 + 1)(\tfrac{1}{4}) = \tfrac{2}{4} = \tfrac{1}{2}$$

$$Final\ Trust = (Trust(D\text{->}A)_B + Trust(D\text{->}A)_c)/\text{Number of Trust Relationships} = (1+0.5)/2 = 0.75$$

Assume in this example, trust is "1" for trusted nodes and trust is "−1" for nodes that are not trusted. The maximum trust assertion at a trust distance "n" is computed as the sum of trust values for the identified paths divided by $2^n$. Therefore, based on the Trust (D->A) request, system 204 of node A determines that it can assert a maximum trust value of "0.75." Based on sensitivity table 500 of FIG. 5, system 204 of node A can subsequently permit system 210 of node D access to services which may expose information assets rated as high as "high" sensitivity.

Illustrative embodiments thus provide a process; a computer program product and an apparatus for controlling access to assets within a data processing system by trust assertion. The trust assertion allows systems to decentralize trust using hierarchical weights associated with systems along a path between a requesting system and a truster system. The hierarchical weighting further enables the access control to avoid skewing due to malicious nodes adjacent the truster system.

One illustrative embodiment provides a computer-implemented method for access control by trust assertion using hierarchical weights. The computer-implemented method comprises obtaining an access request for an asset, and identifying a trust value associated with a set of paths associated with the access request to form an identified trust value. The identified trust value is compared with a required trust value and a determination as to whether the identified trust value is greater than or equal to the required trust value is made. Responsive to a determination that the identified trust value is greater than or equal to the required trust value, access to the asset is permitted.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. When implemented using software, the software may include, but is not limited to, firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus (e.g., the data processing system 100 of FIG. 1). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for access control by trust assertion using hierarchical weights, the computer-implemented method comprising:
    identifying a trust value for a set of paths from a start node to an end node, the set of paths being associated with an access request for an asset at the end node, wherein the identified trust value is inversely proportional to a trust distance of a trust assertion between the start and end nodes, and wherein the identified trust value is calculated by: determining a trust value for each path in the set of paths, wherein a positive trust value is assigned to each path in the set of paths having a positive trust assertion and a negative trust value is assigned to each path in the set of paths having a negative trust assertion; determining a summary path value for the set of paths by summing the trust values for each path in the set of paths; and determining a final trust value by dividing the summary path value by the number of the paths in the set of paths;
    comparing the identified trust value with a required trust value;

determining whether the identified trust value is greater than or equal to the required trust value; and responsive to a determination that the identified trust value is greater than or equal to the required trust value, permitting access to the asset.

2. The computer-implemented method of claim 1, wherein identifying a trust value further comprises:

obtaining path information associated with each path formed between a request system and a truster system; and identifying each path between the start and end nodes associated with the access request to form identified paths in the set of identified paths.

3. The computer-implemented method of claim 1, wherein identifying a trust value further comprises:

storing the final trust value in a data structure.

4. The computer-implemented method of claim 1, wherein comparing the identified trust value with a required trust value further comprises:

obtaining the required trust value from a sensitivity data structure.

5. The computer-implemented method of claim 1, wherein comparing the identified trust value with a required trust value further comprises:

obtaining a node trust value for each system in a path associated with the set of paths.

6. The computer-implemented method of claim 1 wherein the asset is selected from a set of assets including physical resources, or logical resources, or a combination of physical resources and logical resources, wherein the physical resources and logical resources further include services.

7. The computer-implemented method of claim 2, wherein determining whether the identified trust value is greater than or equal to the required trust value further comprises:

responsive to a determination that the identified trust value is not greater than or equal to the required trust value, issuing an error to the request system.

8. A computer program product, stored on a non-transitory computer readable storage medium, for access control by trust assertion using hierarchical weights, the computer program product comprising computer executable program code for:

identifying a trust value for a set of paths from a start node to an end node, the set of paths being associated with an access request for an asset at the end node, wherein the identified trust value is inversely proportional to a trust distance of a trust assertion between the start and the end nodes, and wherein the identified trust value is calculated by: determining a trust value for each path in the set of paths, wherein a positive trust value is assigned to each path in the set of paths having a positive trust assertion and a negative trust value is assigned to each path in the set of paths having a negative trust assertion; determining a summary path value for the set of paths by summing the trust values for each path in the set of paths; and determining a final trust value by dividing the summary path value by the number of the paths in the set of paths;

comparing the identified trust value with a required trust value;

determining whether the identified trust value is greater than or equal to the required trust value; and responsive to a determination that the identified trust value is greater than or equal to the required trust value, permitting access to the asset.

9. The computer program product of claim 8, wherein identifying a trust value further comprises:

obtaining path information associated with each path formed between a request system and a truster system; and identifying each path between the start and end nodes associated with the access request to form identified paths in a set of identified paths.

10. The computer program product of claim 8, wherein identifying a trust value further comprises:

storing the final trust value in a data structure.

11. The computer program product of claim 8, wherein comparing the identified trust value with a required trust value further comprises:

obtaining the required trust value from a sensitivity data structure.

12. The computer program product of claim 8, wherein comparing the identified trust value with a required trust value further comprises:

obtaining a node trust value for each system in a path associated with the set of paths.

13. The computer program product of claim 9, wherein determining whether the identified trust value is greater than or equal to the required trust value further comprises:

responsive to a determination that the identified trust value is not greater than or equal to the required trust value, issuing an error to the request system.

14. An apparatus for access control by trust assertion using hierarchical weights, the apparatus comprising:

at least one computing device configured to perform a method, the method comprising:

identifying a trust value for a set of paths from a start node to an end node, the set of paths being associated with an access request for an asset at the end node, wherein the identified trust value is inversely proportional to a trust distance of a trust assertion between the start and the end nodes, and wherein the identified trust value is calculated by: determining a trust value for each path in the set of paths, wherein a positive trust value is assigned to each path in the set of paths having a positive trust assertion and a negative trust value is assigned to each path in the set of paths having a negative trust assertion; determining a summary path value for the set of paths by summing the trust values for each path in the set of paths; and determining a final trust value by dividing the summary path value by the number of the paths in the set of paths;

comparing the identified trust value with a required trust value;

determining whether the identified trust value is greater than or equal to the required trust value; and responsive to a determination that the identified trust value is greater than or equal to the required trust value, permitting access to the asset.

15. The apparatus of claim 14, wherein identifying a trust value further comprises:

obtaining path information associated with each path formed between a request system and a truster system; and identifying each path between the start and end nodes associated with the access request to form identified paths in a set of identified paths.

16. The apparatus of claim 14, wherein identifying a trust value further comprises:

storing the final trust value in a data structure.

17. The apparatus of claim 14, wherein comparing the identified trust value with a required trust value further comprises:
   obtaining the required trust value from a sensitivity data structure.

18. The apparatus of claim 14, wherein comparing the identified trust value with a required trust value further comprises:
   obtaining a node trust value for each system in a path associated with the set of paths.

19. The apparatus of claim 15, wherein determining whether the identified trust value is greater than or equal to the required trust value further comprises:
   issuing an error to the request system, responsive to a determination that the identified trust value is not greater than or equal to the required trust value.

* * * * *